(12) United States Patent
Iyori et al.

(10) Patent No.: US 7,976,251 B2
(45) Date of Patent: Jul. 12, 2011

(54) INDEXABLE INSERT

(75) Inventors: Hideto Iyori, Sorachi-gun (JP);
Norihide Kimura, Sorachi-gun (JP);
Keiichi Tsuda, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 348 days.

(21) Appl. No.: 12/399,741

(22) Filed: Mar. 6, 2009

(65) Prior Publication Data
US 2009/0226269 A1    Sep. 10, 2009

(30) Foreign Application Priority Data
Mar. 6, 2008  (JP) ................................. 2008-056289

(51) Int. Cl.
*B23B 27/22*  (2006.01)
(52) U.S. Cl. ......... 407/114; 407/113; 407/116; 407/115
(58) Field of Classification Search .......... 407/113–116; B23B 27/22
See application file for complete search history.

(56) References Cited

U.S. PATENT DOCUMENTS

| | | | | |
|---|---|---|---|---|
| 3,815,192 A | * | 6/1974 | Ohtsu et al. ................. | 407/114 |
| 5,044,839 A | * | 9/1991 | Takahashi .................. | 407/114 |
| 5,476,346 A | * | 12/1995 | Lundstrom ................ | 407/114 |
| 5,577,867 A | * | 11/1996 | Paya ........................... | 407/114 |
| 5,743,681 A | * | 4/1998 | Wiman et al. .............. | 407/114 |
| 5,947,651 A | * | 9/1999 | Murakami et al. ......... | 407/114 |
| 7,121,772 B2 | * | 10/2006 | Krahula et al. ............. | 407/113 |
| 7,182,555 B2 | * | 2/2007 | Kitagawa et al. .......... | 407/113 |
| 7,621,700 B2 | * | 11/2009 | Jonsson et al. ............. | 407/114 |
| 2008/0199263 A1 | * | 8/2008 | Jonsson et al. ............. | 407/11 |
| 2011/0070039 A1 | * | 3/2011 | Park et al. .................. | 407/113 |

FOREIGN PATENT DOCUMENTS

| | | | |
|---|---|---|---|
| EP | 1967304 A2 | * | 9/2008 |
| JP | 2002126915 A | * | 5/2002 |
| JP | 2002-210604 A | | 7/2002 |
| JP | 3607288 B2 | | 10/2004 |
| JP | 2008073827 A | * | 4/2008 |
| WO | WO 9422622 A1 | * | 10/1994 |
| WO | WO 2009001973 A1 | * | 12/2008 |

* cited by examiner

*Primary Examiner* — Boyer D Ashley
*Assistant Examiner* — Sara Addisu
(74) *Attorney, Agent, or Firm* — Ditthavong Mori & Steiner, P.C.

(57) ABSTRACT

An indexable insert has a rake face on which a first ridge (2) and a second ridge (3) are provided. The first ridge (2) protrudes from a boss surface (1) towards a nose, and the second ridge (3) extends continuously from the first ridge (2) to a slope (8) connected to a cutting-edge land (7) of a linear cutting edge (6). The second ridge (3) has a height lower than that of the first ridge (2) and is convex-curved towards a bisecting line (CL) of an apex angle of the nose in plan view, thereby achieving both enhanced chip processability and reduction of load received when raking a chip.

3 Claims, 5 Drawing Sheets

INDEXABLE INSERT

BACKGROUND OF THE INVENTION

1. Field of the Invention

The present invention relates to indexable inserts used for turning. In particular, the present invention relates to an indexable insert that provides enhanced durability of a breaker projection while it maintains favorable chip processability so as to minimize deterioration of the chip processability at an early stage.

2. Description of the Related Art

A known indexable insert (sometimes simply referred to as an "insert" hereinafter) for turning, which is used by being attached to a tool holder, is provided with chip breakers on a rake face of the insert to enhance chip processability. The function of a chip breaker is to cut a chip formed during turning to an appropriate length so as to separate the chip from the workpiece and the cutting tool. Chip breakers having various shapes have been proposed, including those disclosed in Japanese Patent No. 3607288 and Japanese Unexamined Patent Application Publication No. 2002-210604.

The chip breakers disclosed in Japanese Patent No. 3607288 and Japanese Unexamined Patent Application Publication No. 2002-210604 are of the most commonly used projected type. In Japanese Patent No. 3607288, breaker projections are provided on the insert face (i.e., the rake face) at positions adjoining the corners of the insert. Each breaker projection has a curved shape having a concave side facing towards the corresponding corner of the insert and a convex side facing away from the corner.

On the other hand, in Japanese Unexamined Patent Application Publication No. 2002-210604, a first breaker projection and second breaker projections are provided on the rake face. The first breaker projection extends from a boss surface (i.e., a central land portion) toward the respective noses. The second breaker projections each extend from an end of the first breaker projection to a slope continuing from a cutting-edge land of the corresponding nose. In plan view, the second breaker projections at each nose have a concave shape along linear cutting edges and are disposed symmetrically with respect to a bisecting line of the nose.

As mentioned on lines 24 to 29 on column 4 of Japanese Unexamined Patent Application Publication No. 2002-210604, at each of the noses, a rising surface extending from a breaker-groove base of a breaker groove is preferably formed from a midsection of the slope, and the second breaker projections are each formed from the midsection of the slope, as mentioned on lines 49 to 50 on column 4 of the publication.

FIG. 11 is a cross-sectional view of a projected-type breaker of the related art, taken along a bisecting line of an apex angle of a nose. A solid line shown in FIG. 11 denotes a chip 20 being removed while sliding on the surface of the breaker. As is apparent from FIG. 11, sections A in the breaker of the related art have a convex shape towards the chip 20. Therefore, the insert and the chip 20 are locally in contact with each other at the sections A, and thus have a small contact area. In the case of a high cutting speed or a large feed, the load applied to the contact regions between the chip 20 and the insert is large, leading to crater abrasion in the contact regions due to a temperature increase or to serious damages caused as a result of detachment of a coating from the insert. These problems can be effectively solved by increasing the length between the cutting edge and the breaker projection to reduce the load received when raking the chip. However, increasing the length between the cutting edge and the breaker projection may deteriorate the chip processability.

In the structure disclosed in Japanese Patent No. 3607288, the breaker projections provided near the noses are used to process chips during large-depth cutting so as to effectively prevent the chips from clogging. As shown in FIG. 12, in common machining, such as external turning, facing, or copy turning, a chip 20 is removed while being curled sideways in plan view. Therefore, with the breaker projections set forth in Japanese Patent No. 3607288, the pressing force applied against the chip 20 is large at section B in FIG. 12, causing the section B to become abraded faster than the other sections. This may result in deterioration of the chip processability at an early stage.

In the structure disclosed in Japanese Unexamined Patent Application Publication No. 2002-210604, a chip formed during small-depth cutting is curled by being restrained by two projections (i.e., left and right second breaker projections) disposed symmetrically with respect to the bisecting line of each nose. Referring to FIG. 13, with regard to a chip formed during large-depth cutting, a chip 20 is processed by being guided from second breaker projections 32 to a first breaker projection 31. However, like the structure disclosed in Japanese Patent No. 3607288, this structure also lacks attention to the protection of the insert. Specifically, as shown in FIG. 13, in the case where the first breaker projection 31 and a rising surface 33 of a breaker groove extend from a midsection of a slope 34, the bottom of the breaker groove forms a V-shape in cross section (FIG. 13) taken along the bisecting line of the corresponding nose. In this case, the chip 20 comes into point contact with the surface of the insert at sections C in FIG. 13. Therefore, the regions of the insert that are in contact with the chip 20 are abraded intensively, leading to chipping of the cutting edge and to reduced chip process ability.

SUMMARY OF THE INVENTION

Accordingly, it is an object of the present invention to provide an indexable insert used for turning, which provides enhanced durability of a breaker projection while it maintains favorable chip processability so as to minimize deterioration of the chip processability at an early stage.

To solve the aforementioned problems, the present invention satisfies both enhanced chip processability and reduction of load received when raking a chip, which were considered to be difficult in the past. In order to achieve this, the present invention provides a polygonal indexable insert used for turning, equipped with a nose cutting-edge and a linear cutting edge extending continuously therefrom. Specifically, the indexable insert includes a rake face; a first ridge formed on the rake face; and a second ridge formed on the rake face. The first ridge protrudes from a boss surface towards a nose. The second ridge extends continuously from the first ridge to a slope connected to a cutting-edge land of the linear cutting edge, the second ridge having a height lower than that of the first ridge and being convex-curved towards a bisecting line of an apex angle of the nose in plan view.

When in use, the insert according to this invention preferably has no directional properties by having the second ridge disposed symmetrically with respect to the bisecting line of the apex angle of the nose.

Furthermore, it is preferable that the second ridge include two second ridges that are disposed symmetrically with respect to the bisecting line of the apex angle of the nose, and that the insert further include a flat breaker base surrounded by the first ridge, the two second ridges, and the nose cutting-edge. In this case, the length of the breaker base in an extending direction of the bisecting line of the apex angle may be set to 30% to 70% of the distance between an apex of the nose and a protruding edge of a top surface of the first ridge, and the depth of the breaker base measured from the cutting edge may be set within a range between 0.03 mm and 0.15 mm.

Moreover, it is preferable that the first ridge have a rising surface defined by a concave-curved slope.

In the insert according to this invention, a chip is processed mainly by the first ridge not only during small-depth cutting, but also during large-depth cutting. The second ridge assists the first ridge during large-depth cutting so as to enhance the protection effect of the first ridge. Specifically, since the second ridge is continuously formed, a chip formed during large-depth cutting is guided along the second ridge, thereby preventing the chip from hitting against the first ridge. Because the height of the second ridge is lower than that of the first ridge, a chip guided by the second ridge subsequently comes into contact with the first ridge. However, since the motion energy of the chip is already attenuated and the load applied to the region of the first ridge in contact with the chip is thus alleviated as compared to when the chip directly hits the first ridge, the protection effect of the first ridge is enhanced.

Since the second ridge is convex-curved, the direction in which a chip is removed while being curled sideways during large-depth cutting is aligned with the curved direction of the second ridge. Therefore, the chip can be removed in a low resistive state. Since this reduces the load on the second ridge, damages to the second ridge rarely occur, thereby enhancing the durability of the first and second ridges. Accordingly, satisfactory chip processability can be maintained over a longer period of time by these ridges, as compared to that of a product of the related art.

As mentioned above, in the insert that further includes the flat breaker base surrounded by the first ridge, the two second ridges, and the nose cutting-edge, the length of the breaker base in the extending direction of the bisecting line of the apex angle of the nose may be set to 30% to 70% of the distance between the apex of the nose and the protruding edge of the top surface of the first ridge, and the depth of the breaker base measured from the cutting edge may be set within a range between 0.03 mm and 0.15 mm. In this case, the chip also comes into contact with the breaker base. Thus, the energy of the chip when it reaches the first ridge is further reduced, thereby further enhancing the effect of alleviating the load on the first ridge as well as the effect of minimizing damages to the first ridge.

Furthermore, in the insert in which the rising surface of the first ridge is defined by a concave-curved slope, the contact area between the first ridge and the chip is increased, thereby further enhancing the effect of alleviating the load on the first ridge.

DETAILED DESCRIPTION OF THE INVENTION

Figure 1:
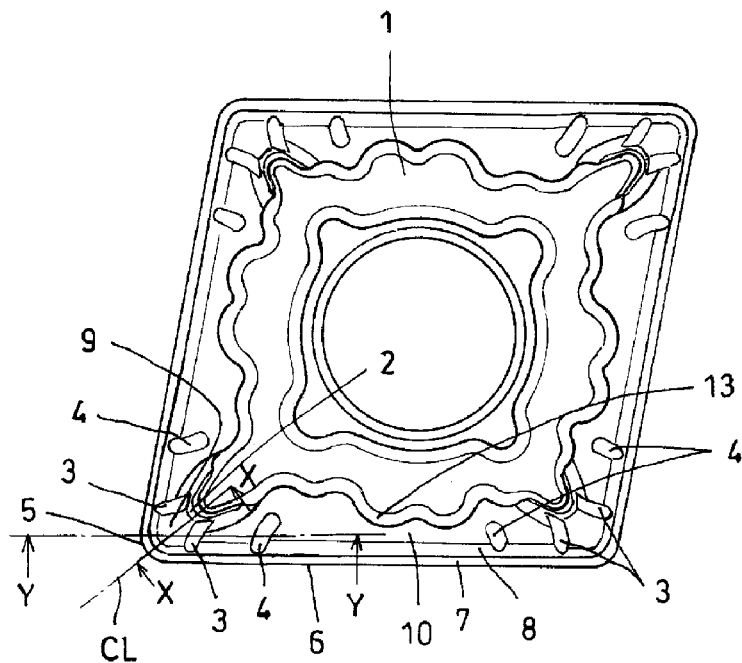
FIG. 1 is a plan view of an insert according to an embodiment of the present invention.
Figure 2:
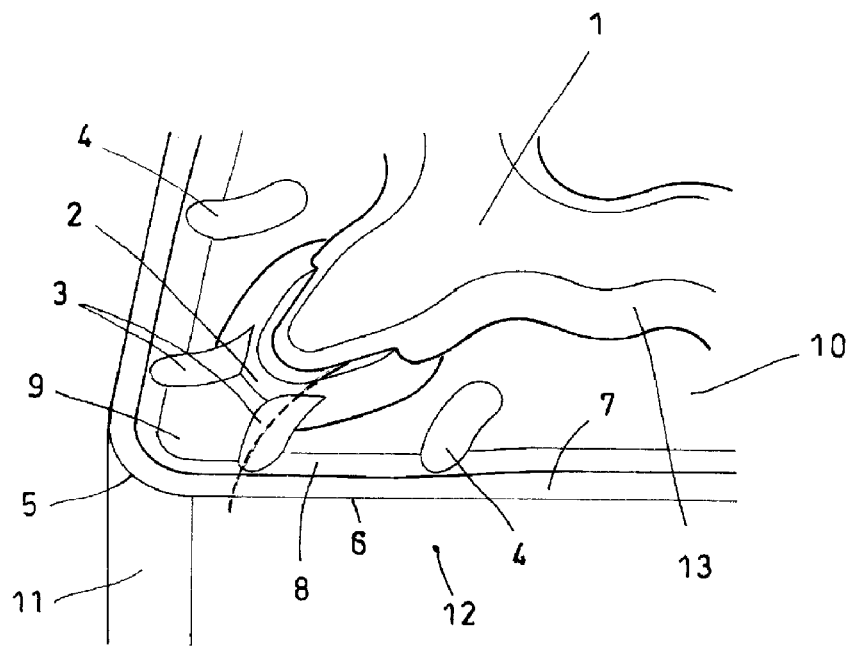
FIG. 2 is an enlarged perspective view showing a relevant part of the insert.

An indexable insert according to an embodiment the present invention will be described below with reference to FIGS. 1 to 10B. FIG. 1 is a plan view of a rake face of a diamond-shaped insert according to this invention, as viewed from above. FIG. 2 is a perspective view of one of acute corners of the insert shown in FIG. 1. This insert has a flat boss surface 1 at a central section on the top face thereof, two acute corners, and two obtuse corners. At each acute corner, the rake face has thereon a single first ridge 2 and a plurality of second ridges 3, and likewise, at each obtuse corner, the rake face has thereon a single first ridge 2 and a plurality of second ridges 3. These first ridges 2 and the second ridges 3 are characteristic features of this invention. The insert also has third ridges 4 at positions separated from the second ridges 3 by a predetermined distance. Although the first ridges 2 and the second ridges 3 in the obtuse corners have the same configuration as those in the acute corners, these ridges in the obtuse corners are not essential elements. Therefore, the following description will be directed to the configuration of the acute corners, and the description for the obtuse corners will be omitted. Moreover, the description of the bottom face (not shown) of the insert will also be omitted since the configuration thereof is the same as that of the top face.

Referring to FIG. 2, each acute corner has a nose cutting-edge 5 having a predetermined radius of curvature, linear cutting edges 6 extending continuously from the nose cutting-edge 5 and serving as a main cutting edge, a cutting-edge land 7 provided along the nose cutting-edge 5 and the linear cutting edges 6, breaker bases 9 and 10 provided on the rake face, a nose flank 11, and linear-cutting-edge flanks 12.

When attaching the insert to a holder, the face not involved in turning of the boss surface 1 is used as a seating face.

Figure 3:
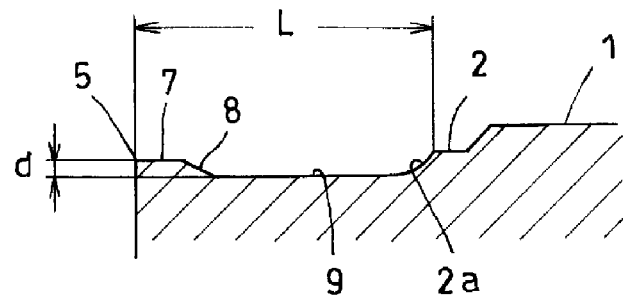
FIG. 3 is an enlarged cross-sectional view taken along line X-X in FIG. 1.

In each acute corner, the first ridge 2 protrudes toward the nose from the boss surface 1. The height at the top surface of the first ridge 2 is lower than that of the boss surface 1 but is higher than that of the nose cutting-edge 5. Referring to FIG. 3, the first ridge 2 has a rising surface 2a defined by a concave-curved slope. With this rising surface 2a, the contact area with a chip is increased so that the contact pressure can be dispersed over a wider area, thereby reducing the load applied to the contact surface per unit area. Because the height at the top surface of the first ridge 2 is set lower than that of the boss surface 1, a chip can be prevented from being raked by or attached to the boss surface 1. Consequently, the insert can be stably seated when using the cutting edge at the bottom face side.

The second ridges 3 extend continuously from the first ridge 2 towards the cutting-edge land 7 until reaching a slope 8 connected to the cutting-edge land 7. The height of the second ridges 3 is lower than that at the top surface of the first ridge 2 (reference character h in FIG. 4 denotes the height of the second ridges 3 measured from the breaker base 9). In plan view of the insert, the second ridges 3 in each acute corner are convex-curved towards a bisecting line CL of an apex angle of the nose. As mentioned above, the second ridges 3 extend to the slope 8. Accordingly, a chip formed during small-depth cutting can be prevented from hitting against the protruding ends of the second ridges 3, thereby protecting the protruding ends.

In each acute corner of the insert shown in the drawings, the second ridges 3 are formed symmetrically with respect to the bisecting line CL of the apex angle. Moreover, an area surrounded by the two symmetrical second ridges 3, the first ridge 2, and the nose cutting-edge 5 acts as the breaker base 9. This breaker base 9 is a flat surface. Referring to FIG. 3, the length of the breaker base 9 in the extending direction of the bisecting line CL is set to 30% to 70% of a distance L between the apex of the nose and a protruding edge of the top surface of the first ridge 2. Moreover, referring to FIGS. 3 and 4, a depth d of the breaker base 9 measured from the cutting edge is set smaller than that in a product of the related art. The width of the breaker base 9 first increases from the tip of the nose towards the center of the insert and then decreases along the second ridges 3.

The following are examples of the cross-sectional shape of the second ridges 3. Specifically, the examples include a circular arc shape as shown in a vertical cross-sectional view in FIG. 4, a shape shown in FIG. 9 in which a side surface 3a of each second ridge 3 is concave-curved, and a convexly projected shape or a concavely depressed shape as shown in a longitudinal sectional view (i.e., a sectional view taken along a dashed line in FIG. 2) in FIG. 10A or FIG. 10B. Since the second ridges 3 with the circular-arc cross-sectional shape shown in FIG. 4 have no sections where the load concentrates, damages to the second ridges 3 caused by coming into contact with a chip rarely occur. The second ridges 3 with the shape shown in FIG. 9 have an increased contact area with a chip so that the contact pressure can be dispersed over a wider area. The second ridges 3 with the shapes shown in FIGS. 10A and 10B can be expected to exhibit similar advantages.

Figure 10A:
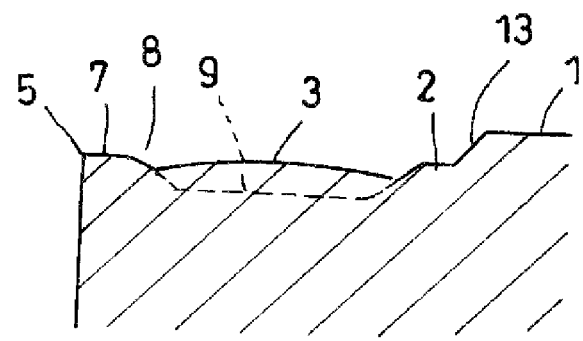
FIG. 10A is a longitudinal sectional view of a second ridge according to a modification.
Figure 10B:
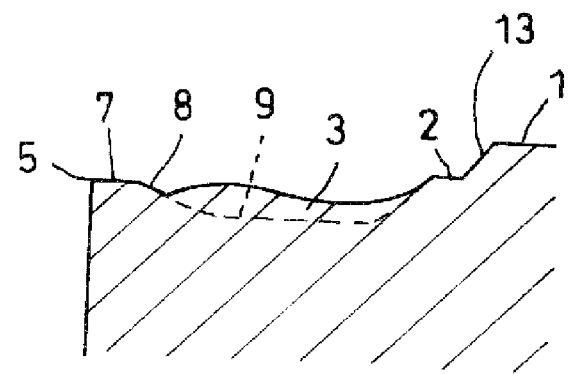
FIG. 10B is a longitudinal sectional view of a second ridge according to another modification.
Figure 11:
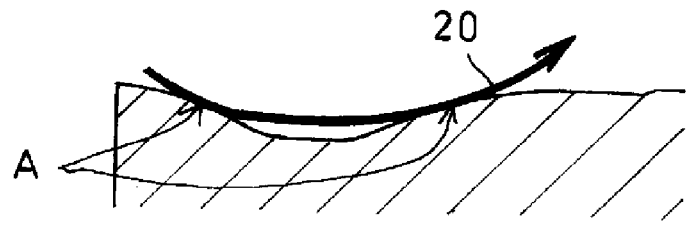
FIG. 11 is a schematic cross-sectional view showing how an insert of the related art comes into contact with a chip.
Figure 12:
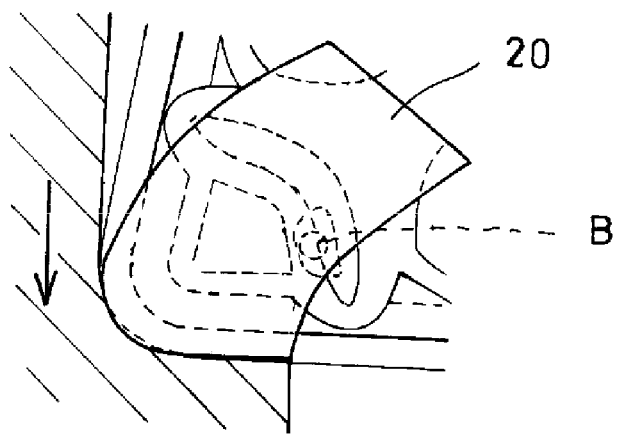
FIG. 12 is a schematic plan view showing how an insert set forth in Japanese Patent No. 3607288 comes into contact with a chip.
Figure 13:
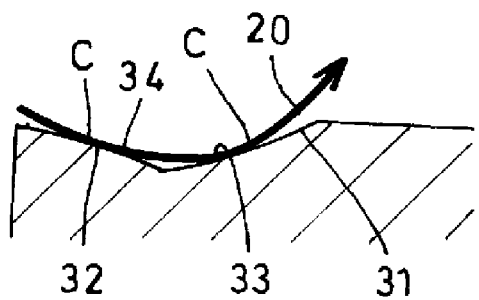
FIG. 13 is a schematic cross-sectional view showing how an insert set forth in Japanese Unexamined Patent Application Publication No. 2002-210604 comes into contact with a chip.

With the shapes shown in FIGS. 10A and 10B, the projected shape of the second ridges 3 is maintained so as to enhance the effect of deforming a chip, thereby allowing for favorable chip processability. In plan view of the insert, the second ridges 3 in each acute corner are convex-curved towards the bisecting line CL of the apex angle of the nose. With regard to other alternative shapes, a suitable shape may be selected in view of the balance between chip processability and the protection effect of the ridges.

The third ridges 4 are provided on the same linear cutting edges 6 as the second ridges 3 and are curved in the same direction as the second ridges 3. The third ridges 4 are disposed farther away from the nose cutting-edge 5 than the second ridges 3. Although the third ridges 4 are effective in terms of expanding the processable range of the insert against variable machining conditions, these third ridges 4 are considered only as preferable elements.

The breaker base 10 is provided between the cutting-edge land 7 extending along the linear cutting edges 6 and a slope 13 extending along the periphery of the boss surface 1. The third ridges 4 project upward from the breaker base 10. In the insert shown in the drawings, the breaker base 10 is a flat surface and the depth thereof measured from the cutting edge is set greater than that of the breaker base 9 by a depth d1 (see FIG. 4). This configuration is preferable in terms of reasons to be described later.

Figure 5:
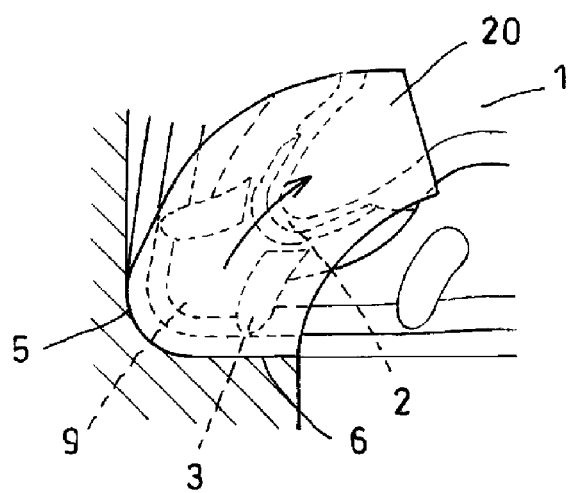
FIG. 5 is a plan view showing how a chip is processed during large-depth cutting.
Figure 6:
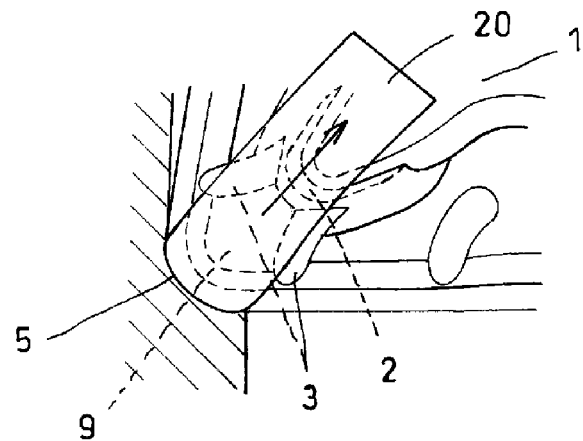
FIG. 6 is a plan view showing how a chip is processed during small-depth cutting.
Figure 7:
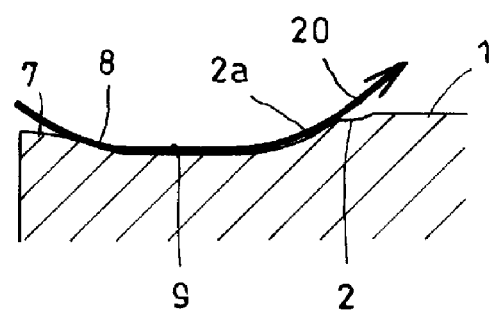
FIG. 7 is a schematic cross-sectional view showing a contact state of a chip, taken along a bisecting line of an apex angle of a nose.

FIGS. 5 and 6 illustrate how a chip 20 is removed by one of the acute corners of the insert during large-depth cutting and small-depth cutting, respectively. Referring to FIGS. 6 and 7, a chip 20 formed during small-depth cutting moves along the bisecting line of the apex angle of the corner while sliding on the slope 8 and the breaker base 9, and then curls at the first ridge 2. On the other hand, referring to FIG. 5, a chip 20 formed during large-depth cutting curls sideways by being guided by one of the second ridges 3. After the motion energy of the chip 20 is alleviated, the chip 20 comes into contact with the first ridge 2 where the chip 20 is cut off. Since the second ridges 3 extend to the slope 8 and are curved in the same direction as the moving direction of the chip 20, the resistance of the chip 20 against removal can be minimized. This reduces the load on the second ridges 3, thereby minimizing damages to the second ridges 3. Since these effects enhance the durability of the first ridge 2 and the second ridges 3, satisfactory chip processability can be maintained over a longer period of time by these ridges, as compared to that of a product of the related art.

The following describes preferred embodiments.

1. The depth d of the breaker base 9, shown in FIGS. 3 and 4, measured from the cutting edge is set within a range between 0.03 mm and 0.15 mm. In common machining conditions (i.e., a cutting depth of 1 to 5 mm and a feed of 0.1 to 0.6 mm/rev), this numerical range allows for a greater contact area with a chip, thereby exhibiting a high effect of minimizing damages to the ridges.

2. The distance L from the apex of the nose to the protruding edge of the top surface of the first ridge 2 shown in FIG. 3 is set within a range between 1.2 mm and 2.2 mm. This range is preferable in that a chip can be properly curled without causing chip clogging.

Figure 4:
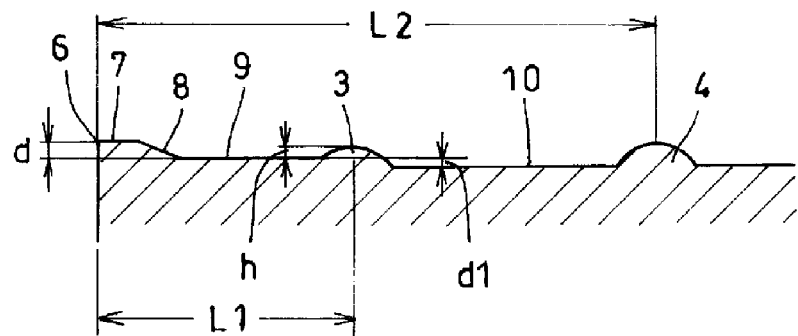
FIG. 4 is an enlarged cross-sectional view taken along line Y-Y in FIG. 1.

3. The depth d1 measured from the breaker base 9 to the breaker base 10 shown in FIG. 4 is set larger than or equal to 0.02 mm. This increases the space of the breaker groove into which a chip formed during large-depth cutting enters, thereby minimizing the occurrence of chip clogging.

4. The height h measured from the breaker base 9 to each second ridge 3 shown in FIG. 4 is set within a range between 0.03 mm and 0.15 mm. If this height h is set below 0.03 mm, the advantage of installing the second ridges 3 is reduced and the first ridge 2 cannot be satisfactorily protected. On the other hand, setting the height h above 0.15 mm can increase the possibility of damaging the second ridges 3.

5. A distance L1 between each linear cutting edge 6 and the nearest second ridge 3 shown in FIG. 4 is set within a range between 0.5 mm and 3.0 mm. With this configuration, a satisfactory damage minimization effect can be achieved for the ridges in a cutting range of up to about 5 mm.

6. A distance L2 between each linear cutting edge 6 and the nearest third ridge 4 shown in FIG. 4 is set within a range between 2.0 mm and 6.0 mm. With this configuration, a damage minimization effect can be achieved for the ridges even when performing large-depth cutting of 5 mm or more.

Figure 8:
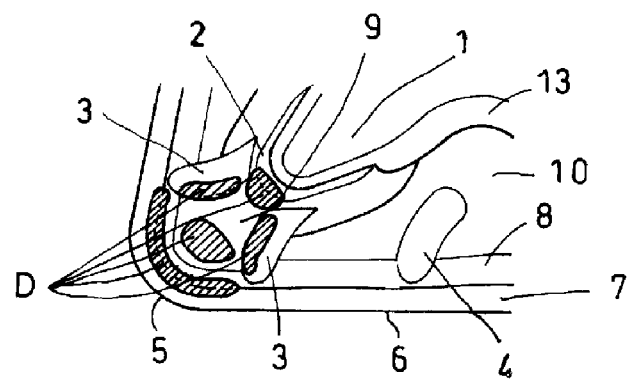
FIG. 8 is a plan view of a region with which a chip comes into contact.
Figure 9:
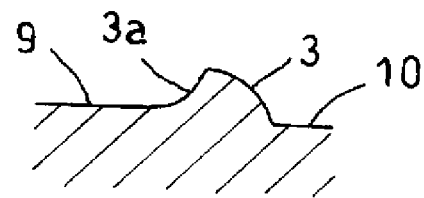
FIG. 9 is a cross-sectional view of a second ridge having a modified side surface.

A region D shown in FIG. 8 is a region with which a chip is brought into contact. Accordingly, in the insert according to this invention, the chip 20 is brought into contact with a wide region for both large-depth cutting and small-depth cutting.

With this increase in the contact area, the load on the contact region is reduced, thereby minimizing abrasion of and damages to the chip rake face.

In the insert according to this invention, a local temperature increase is alleviated by the effect of the second ridges 3. This is confirmed by performing computer-aided engineering analysis of cutting-edge temperature distribution produced by the cutting heat. With the inserts disclosed in Japanese Patent No. 3607288 and Japanese Unexamined Patent Application Publication No. 2002-210604, a local temperature increase is evident. This is believed to be caused by load concentration. Moreover, in an actual machining process performed under the same conditions, local abrasion occurs in an insert of the related art due to load concentration, resulting in a serious damage to the insert. In contrast, abrasion is effectively minimized in the insert according to this invention so that damages to the ridges are advantageously minimized.

What is claimed is:

1. A polygonal indexable insert used for turning, equipped with a nose cutting-edge (5) and a linear cutting edge (6) extending continuously therefrom, the indexable insert comprising:
    a rake face;
    a first ridge (2) formed on the rake face; and
    a second ridge (3) formed on the rake face,
        wherein the first ridge (2) protrudes from a boss surface (1) towards a nose, and
        wherein the second ridge (3) extends continuously from the first ridge (2) to a slope (8) connected to a cutting-edge land (7) of the linear cutting edge (6), the second ridge (3) having a height lower than that of the first ridge (2) and being convex-curved towards a bisecting line (CL) of an apex angle of the nose in plan view, and
        wherein said first ridge has a rising surface defined by a concave-curved slope.

2. The indexable insert according to claim 1, wherein the second ridge (3) is disposed symmetrically with respect to the bisecting line (CL) of the apex angle of the nose.

3. The indexable insert according to claim 2, wherein the second ridge (3) comprises two second ridges (3, 3) that are disposed symmetrically with respect to the bisecting line (CL) of the apex angle of the nose,
    wherein the indexable insert further comprises a flat breaker base (9) surrounded by the first ridge (2), the two second ridges (3, 3), and the nose cutting-edge (5),
    wherein a length of the breaker base (9) in an extending direction of the bisecting line (CL) of the apex angle is set to 30% to 70% of a distance (L) between an apex of the nose and a protruding edge of a top surface of the first ridge (2), and a depth (d) of the breaker base (9) measured from the cutting edge is set within a range between 0.03 mm and 0.15 mm.

* * * * *